US007918389B2

(12) United States Patent
Dwyer et al.

(10) Patent No.: US 7,918,389 B2
(45) Date of Patent: Apr. 5, 2011

(54) METHOD AND SYSTEM FOR TRACKING UNFINISHED CERAMIC STRUCTURES DURING MANUFACTURE

(75) Inventors: Daniel P. Dwyer, Corning, NY (US); L. Urdenis Johnson, Tyrone, PA (US); Nalin S. Nair, Lockwood, NY (US); Dennis F. Rumsey, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 445 days.

(21) Appl. No.: 11/803,536

(22) Filed: May 15, 2007

(65) Prior Publication Data

US 2008/0283588 A1 Nov. 20, 2008

(51) Int. Cl.
*G06Q 40/00* (2006.01)

(52) U.S. Cl. ....................................................... 235/379

(58) Field of Classification Search .................. 235/379
See application file for complete search history.

(56) References Cited

U.S. PATENT DOCUMENTS

| | | | | |
|---|---|---|---|---|
| 4,176,260 | A * | 11/1979 | Ward et al. | 235/475 |
| 5,388,945 | A * | 2/1995 | Garric et al. | 414/217.1 |
| 5,682,331 | A * | 10/1997 | Berlin | 702/150 |
| 5,808,268 | A | 9/1998 | Balz et al. | 219/121.8 |
| 5,997,388 | A * | 12/1999 | Canella et al. | 451/67 |
| 7,098,793 | B2 | 8/2006 | Chung | 340/572.1 |
| 7,182,259 | B2 | 2/2007 | Lubow et al. | 235/462.01 |
| 2005/0082376 | A1 | 4/2005 | Lubow et al. | 235/494 |
| 2006/0073970 | A1 | 4/2006 | Yamada | 502/439 |
| 2006/0142889 | A1 * | 6/2006 | Duggan et al. | 700/109 |
| 2006/0269722 | A1 | 11/2006 | Yamada | 428/116 |
| 2008/0055348 | A1 | 3/2008 | Deeter et al. | 347/9 |
| 2008/0079333 | A1 * | 4/2008 | Ulm et al. | 310/339 |
| 2009/0176008 | A1 * | 7/2009 | Dovertie et al. | 427/8 |

FOREIGN PATENT DOCUMENTS

| | | |
|---|---|---|
| EP | 1475167 | 6/2004 |
| WO | 01/76805 | 10/2001 |
| WO | 2008/027352 | 3/2008 |
| WO | 2008/027410 | 3/2008 |
| WO | 2008/066922 | 6/2008 |

* cited by examiner

*Primary Examiner* — Daniel A Hess
*Assistant Examiner* — David Tardif
(74) *Attorney, Agent, or Firm* — Susan S. Wilks

(57) ABSTRACT

A system and method is provided for tracking unfinished ceramic structures moved by a conveyor system through manufacturing loops which preserves both identification and manufacturing information during manufacture, and in particular during mark-obliterating steps. The method includes loading the marked, unfinished ceramic structure at a selected position on the conveyor system; relaying the identification mark and the selected position of the unfinished ceramic structure on the conveyor system; conveying the unfinished ceramic structure through a mark-obliterating manufacturing step, and then identifying the ceramic structure relaying and processing information relating to its position on the conveyor system. The ceramic structure is then re-marked with a second mark after completing all mark-obliterating steps of manufacturing, such as firing and contouring. Both the first and second marks include the combination of a machine-readable and human-readable component, such as the combination of a two-dimensional bar code and an alpha-numeric code.

20 Claims, 3 Drawing Sheets

METHOD AND SYSTEM FOR TRACKING UNFINISHED CERAMIC STRUCTURES DURING MANUFACTURE

FIELD OF THE INVENTION

This invention generally relates to the tracking of unfinished ceramic structures during manufacture, and is specifically concerned with a system and method for marking, virtually tracking, and re-marking a ceramic structure after it undergoes firing so that information relating to the identification and manufacturing conditions of the ceramic structure may be reliably preserved for quality control purposes.

BACKGROUND OF THE INVENTION

Ceramic honeycomb structures are widely used as anti-pollutant devices in the exhaust systems of automotive vehicles, both as catalytic converter substrates in automobiles, and diesel particulate filters in diesel-powered vehicles. In both applications, the ceramic honeycomb structures are formed from a matrix of thin ceramic webs which define a plurality of parallel, gas conducting channels. In honeycomb structures used as ceramic catalytic substrates, the cell density may be as high as about 900 cells per square inch. To reduce the pressure drop that the exhaust gases create when flowing through the honeycomb structure, the web walls are rendered quite thin, i.e. on the order of 2-6 mils. Ceramic honeycomb structures used as diesel particulate filters have a lower cell density of between about 100 and 400 cells per square inch, formed from webs on the order of 12-25 mils thick. In both cases, the matrix of cells is preferably surrounded by an outer skin which is quite thin, i.e. generally two or three times thicker than the web walls.

Such ceramic honeycomb structures are typically manufactured by way of a procedure in which conveyor units in the form of trams, trays or pallets of a conveyor system continuously move unfinished ceramic bodies through a number of stations, hereinafter referred to as “manufacturing loops”, each of which completes one or more necessary manufacturing steps. In the first steps of the manufacturing process, the ceramic ingredients are pulverized and mixed together with a binder to form a paste-like substance which is extruded into a honeycomb body. The extruded honeycomb body is cut into segments that form green ceramic bodies, which are then loaded into the automatic conveyor system. The conveyor system then slowly moves these green bodies through a kiln, where they are fired at temperatures of typically 1300° C. or higher in order to fuse the batch constituent particles present in the extruded material into a ceramic fired body. The ceramic fired bodies may then be conveyed to a contouring station where all the outer skin of the body is abraded off, and replaced with a new skin that meets precise dimensions. The conveyor system may then move the contoured ceramic bodies through another kiln in which they are fired again at lower temperatures, for example, on the order of 800° C. or more, and from there to a coating station that coats the gas contacting surfaces with a washcoat that may contain catalytic metals. Finally, the automatic conveyor system moves the finished ceramic structures to a packaging station where they are packaged and arranged for shipping.

Due to the thinness of the outer skin and the inner cell-forming webs, the substantial thermal stresses that the unfinished ceramic structures undergo during the firing processes, and the necessary mechanical handling of the green and fired bodies during the manufacturing process, defects such as internal cracks and voids may occur, as well as separations between the outer skin and the inner matrix of webs. To reduce the occurrence of such defects, it would be desirable to have a quality control procedure which allowed the manufacture to reliably trace any defective ceramic honeycomb structure back to the specific factory, kiln, and batch that it originated from. Such a procedure would allow the manufacturer to review the particular manufacturing parameters used to fabricate the defective unit and to modify its manufacturing operation in order to reduce the occurrence of such defects in future articles. Accordingly, it is a known procedure to mark, after the final firing or heating step, finished ceramic honeycomb structures with marks containing manufacturing information so that remedial manufacturing operations may be implemented.

Unfortunately, the applicants have observed that such a marking procedure does not reliably result in an accurate recovery of the manufacturing information associated with a particular ceramic honeycomb structure. In particular, the applicants have observed that subsequent to the manufacture of the green bodies of such structures, different batches of fired bodies from different kilns necessarily become mixed together in order to efficiently implement other stages of the fabrication process. Additionally, different unfinished ceramic structures may be removed from one or more manufacturing loops, put into storage, and then reintroduced either onto the conveyor system or directly into another manufacturing loop. Hence a quality control process where manufacturing information is printed on the finished ceramic honeycomb structures may not accurately reflect the actual manufacturing conditions and history of the structures, as structures which end up adjacent to one another in the final conveyor units might have quite different manufacturing histories.

Some of the aforementioned problems could be avoided by printing a data-carrying mark on the side wall of the green bodies that ultimately form finished completed ceramic honeycomb structures. Such a mark could include a detailed manufacturing history of the structure. However, even the best high-temperature inks known in the prior art fade or run when subjected to the 1100° C. to 1460° C. temperatures necessary to fire the green bodies into the ceramic structures, thereby making it difficult for the mark (whether in the form of a bar code or alpha-numeric code) to maintain the number of characters necessary to accurately preserve a detailed manufacturing history of the ceramic structure. And even if more durable high-temperature inks are ultimately discovered, there are some steps in the manufacture of ceramic honeycomb structures, such as contouring, which require the outer skin of the structure to be removed, thereby unequivocally obliterating any data-carrying mark printed on the outer surface of such structures.

Accordingly, there is a need for a system and method for reliably and accurately preserving both identification and manufacturing information throughout the manufacture of an unfinished honeycomb ceramic structure, and in particular throughout mark-obliterating manufacturing steps such as firing and contouring. Ideally, such a system and method would be easy and inexpensive to incorporate into presently-used ceramic manufacturing facilities, and would not result in production bottlenecks which would slow the rate of production. Finally, it would be desirable if the amount of manufacturing information preserved for each individual ceramic structure was not confined to the informational limits of a bar code or other type of data-carrying mark that could be rapidly and easily printed on the side of a ceramic structure during manufacture.

SUMMARY OF THE INVENTION

Generally speaking, the invention is a system and method for tracking unfinished ceramic structures moved by a conveyor system during manufacture which reliably and accurately preserves both identification and manufacturing information during all steps of manufacture, and in particular during mark-obliterating steps such as firing or contouring. To this end, the system of the invention includes a conveyor system for conveying an unfinished ceramic structure to and from a mark-obliterating manufacturing step; a marking mechanism that provides an identification mark on the unfinished ceramic structure prior to the conveyance of said unfinished ceramic structure through said mark-obliterating step; a positioning mechanism for placing said unfinished ceramic structure on a selected unique position on said conveyor system, and a digital processor for receiving and processing both the information in the identification mark and the selected unique position of the unfinished ceramic structure on the conveyor system, such that the ceramic structure may be identified by its unique position on the conveyor system when the ceramic structure is conveyed from said mark-obliterating manufacturing step.

The method of the invention comprises the steps of loading the marked, unfinished ceramic structure at a selected position on a conveyor system; processing the information in the identification mark and the selected position of the unfinished ceramic structure on the conveyor system; conveying the unfinished ceramic structure through at least one mark-obliterating manufacturing step, and identifying the ceramic structure after completion of the mark-obliterating step by determining its position on the conveyor system and processing information relating to the determined position along with the information relating to the identification mark and the selected position. The ceramic structure may then be re-marked with a second mark after completing all mark-obliterating steps of manufacturing, such as firing and contouring. The second mark may include all of the identification and other data carried by the first mark. While both marks are preferably a combination of machine-readable and human-readable marks such as a two-dimensional bar code accompanied by an alpha-numeric code, the invention encompasses any type of mark capable of carrying a code or a unique number, whether machine-readable or human-readable or both.

The selected position may be recorded as a unique combination of three coordinates of the tram or other conveyor unit if the ceramic structures are arranged in a multi-layer stack, or a unique combination of only two coordinates if the ceramic structures are arranged in a single layer as they may on a conveyor-belt type component of the conveyor system. The individual trams, trays or conveyor belt slats may be barcoded to assist with the step of assigning each unfinished ceramic structure with a unique position in the conveyor system. Optical bar code readers may be provided to read the barcodes, sensors may be provided at various manufacturing stations and loops to generate data concerning ambient manufacturing conditions, and a digital processor connected to the optical bar code readers and sensors may be used to convert the barcodes into position information and to associate it with one of the ceramic structures as well as the particular time and conditions surrounding each manufacturing step. The manufacturing conditions recorded may include, for example, date and time that a firing step was implemented, the ambient temperature, humidity, and atmospheric pressure, the position of the ceramic structure on the conveyer unit that moved the ceramic structure through the kiln, the amount of time that the ceramic structure was in or exposed to the kiln, and variations in the measured temperature in the kiln over the time period that the ceramic structure was fired.

The system and method of the invention reliably and accurately preserve the manufacturing history of each ceramic structure from green body to finished structure despite the mark-obliterating manufacturing steps that such structures are ordinarily subjected to, and despite batch-mixing at one or more manufacturing loops which typically occurs to maximize production efficiency. The fact that a digital processor is used to store the detailed manufacturing history of the ceramic structure, instead of the marks themselves, allows the use of a mark which carries no more than identification information to retrieve a detailed manufacturing history of the ceramic structure from the digital processor used to implement the method.

DETAILED DESCRIPTION OF THE PREFERRED EMBODIMENTS

Figure 1:
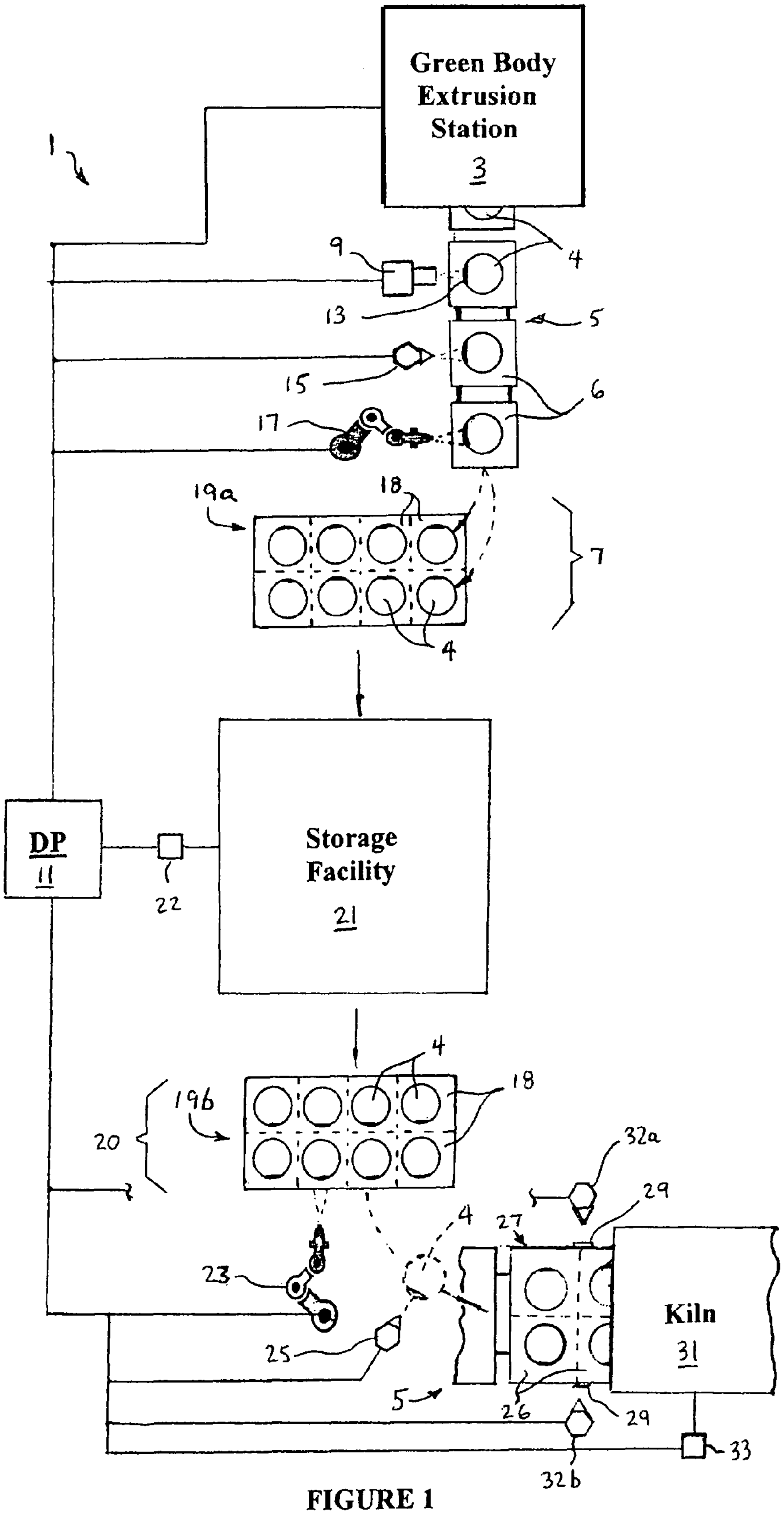
FIG. 1 is a schematic diagram of a preferred system for implementing the first steps of the method, wherein green bodies from a green body extrusion station are marked with an identification code, palletized, stored, retrieved, and then loaded onto a conveyor system that takes them to a kiln.

With reference to FIG. 1, wherein like numerals designate like components throughout all the several figures, the system 1 of the invention includes a green body extrusion station 3 that extrudes and dries unfinished ceramic structures 4 which ultimately become finished ceramic structures after firing and other manufacturing steps. A conveyor system 5 formed from individual conveyor units 6 (which may be trams, cars, or individual slats of a conveyor belt) conveys the structures 4 to a palletizing area 7. In this application, the term "conveyor unit" refers to any component of the conveyor system that moves a ceramic structure during any step of the manufacturing process, either automatically or manually. Additionally, the term "unfinished" ceramic structure refers to any precursor to a finished ceramic structure that must undergo at least one firing step to become a finished structure, including a dried green body or an unfired or partially fired green body. In route to the palletizing area 7, an ink jet printer 9 that is controlled by a digital processor 11 prints a unique identification mark 13 onto the side of the unfinished ceramic structure, and an optical reader 15 likewise controlled by the processor 11 reads the printed mark in order to confirm the integrity of the printed mark. As will be discussed in more detail later, the mark 13 is essentially a unique number that acts as a "license plate" for the ceramic structure through every stage of manufacture which ultimately allows a complete and detailed manufacturing history to be recalled for each final, finished ceramic structure. Here, in the initial steps of the method of the invention, the date, time, batch number and specific green body fabricating conditions and any additional information are relayed to the digital processor 11 at the time the printer prints an identification mark 13 onto the side of the unfinished ceramic structure 4. Additional information may also be sensed and relayed including temperature, humidity, partial pressure, customer identification, downstream manufacturing steps to be performed, shipping date or any other information that an ordinarily skilled artisan may wish to include. In addition, any information related to conditions during manufacturing, both during normal manufacturing processes and during test manufacturing processes or manufacturing processes that may have experienced abnormal conditions such as power fluctuations, variations of temperature, and sudden or unexpected changes in conditions may be recorded and relayed to the digital processor. The digital processor 11 then proceeds to associate and record the corresponding green body manufacturing information with each identification mark 13, thereby beginning the recordation of a unique and detailed manufacturing history for each of the structures 4.

The unfinished ceramic structures 4 are moved off the conveyer system 5 and placed on to a unique position 18 on a pallet 19 having a unique identifying number assigned to it. This may be implemented by a robotic arm 17 that is programmed to relay the position 18 of each unfinished ceramic structure 4 that it stacks on the pallet 19*a* to the digital processor 11. The digital processor 11 proceeds to associate and record the identification number 13 read by the optical reader 15 with the position 18 on the particular pallet 19*a*. These steps are taken as a precaution in the event that the identification mark 13 is marred or obliterated on the pallet 19*a* as the result of an accident or other unforeseen event, and will allow the structures 4 to be identified via pallet number and unique position 18. While the positioning of the structures 4 is implemented by a robotic arm 17 in this example, such positioning can also be done manually.

In the alternative, the unfinished ceramic structures 4 can be transported by the conveyor system 5 directly from the extrusion station 3 to further manufacturing stations such as kilns, dryers, contouring stations, laser gauge stations, skinning stations, or any other processing stations. It should be noted that the palletizing and storage steps discussed in this specification do not form, in and of themselves, part of the method of the invention. Such steps are discussed only to illustrate how the method of the invention may be applied to a typical ceramic structure manufacturing process where palletizing and storage occurs between one or more of the manufacturing steps which ultimately convert a green body into a finished ceramic structure.

Subsequent to the aforementioned palletizing steps, the pallet 19*a* is moved to a storage facility 21 prior to the implementation of firing and other manufacturing steps. While the storage facility 21 is schematically represented as a single facility, it may in fact include facilities at several locations, some of which are off-site to the factory, others of which are on-site. As is schematically indicated in FIG. 1, the storage facility includes an ambient condition monitoring device 22 which relays information to the digital processor 11 concerning the storage conditions for each individual unfinished ceramic structure, including date of entry, ambient conditions of storage (i.e. temperature and humidity) and date of departure. The storage facility 21 also has its own optical readers (none of which are shown) for scanning the identification marks 13 of structures entering and exiting the facility and relaying this information to the digital processor 11.

Figure 2:
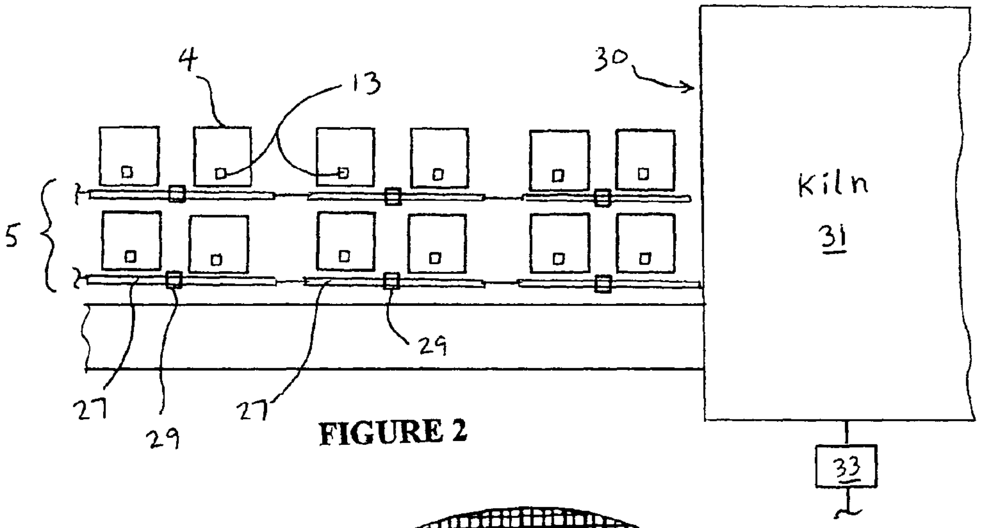
FIG. 2 is a side view of green bodies being conveyed into the entrance of a kiln by a train of kiln cars, each car of which is marked with an identification label, illustrating the steps of the method wherein a unique position on the kiln cars is associated with the identification mark on the green body and recorded by a digital processor.

Subsequent to storage, a pallet 19*b* of green body-type unfinished ceramic structures 4 is transported to a de-palletizing area 20. A robotic arm 23 removes the structures, moves them past another optical reader 25 that reads the individual identification numbers 13 and relays them to the digital processor 11, and positions the structures 4 onto unique positions 26 on kiln cars 27 forming part of the conveyor system 5. The robotic arm is programmed to relay to the digital processor 11 the unique position 26 on the kiln car 27 where it places a particular structure 4. With reference now to both FIGS. 1 and 2, the kiln cars 27 slowly transport the structures 4 through the entrance 30 of a kiln 31 in order to fire them. Each kiln car 27 includes an identifying plate 29 with a number on it, and a pair of optical scanners 32*a*, 32*b* is provided on either side of the kiln so that the processor 11 knows exactly which structure 4 stands on each unique position 26 in each unique kiln car 27. As is evident in FIG. 2, the unfinished ceramic structures 4 may be arranged in a "stacked" configuration when entering the kiln 31, in which case the unique position 26 will be recorded in terms of three dimensions, i.e., as x-y-z coordinates.

Figure 3:
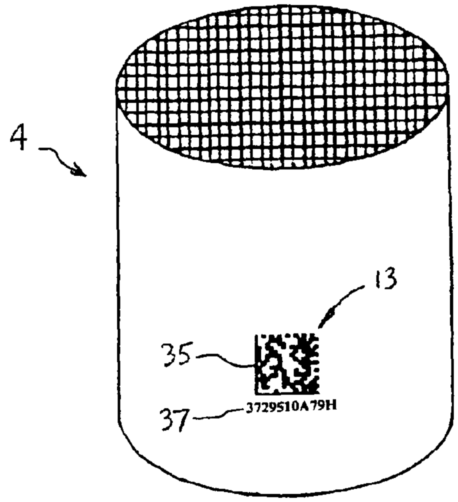
FIG. 3 is a perspective view of a ceramic honeycomb structure bearing an identification mark formed from a machine-readable two-dimensional bar code in combination with a human readable alpha-numeric code.

FIG. 3 illustrates one example of the type of individual identification mark 13 that the previously-referred to printer 9 shown in FIG. 1 might print on the side of the structure 4. Mark 13 is a combination of a machine-readable component 35, and a human-readable alpha-numeric code 37, both of which preferably contain a same identification number. The machine readable component 35 may be a two-dimensional bar code formed from a digital pattern of inked and uninked areas. Such a two-dimensional bar code 35 has the advantage that it can preserve all of its data (which in this case is a unique identification number) even if up to 30% of its area is obliterated or rendered illegible. The parallel provision of the same identification number 37 in human readable form facilitates rapid identification of the structure in instances where the use of an optical reader is either difficult or impossible. Other types of identification symbols and schemes are within the scope of the invention, so long as the information contained within them is sufficient to uniquely identify the unfinished ceramic structure 4 that they are printed on or otherwise attached to.

Figure 4:
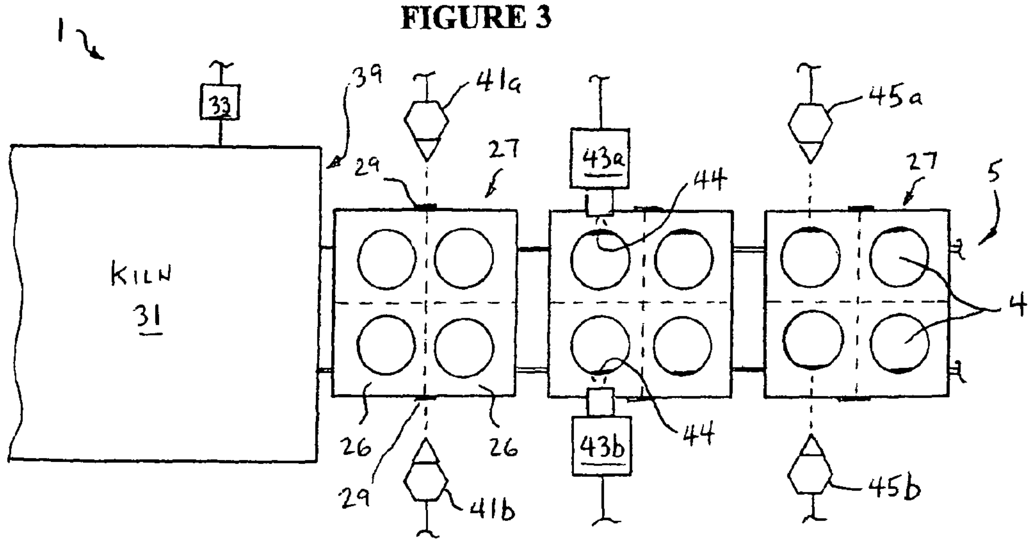
FIG. 4 is a plan view of fired ceramic structures exiting the kiln shown in FIG. 3, illustrating the method steps wherein each fired structure exiting the kiln is identified by its unique position on the kiln car and then re-marked with an identification code.

FIG. 4 illustrates how the system 1 implements the method of the invention after the unfinished ceramic structures 4 have been subjected to a mark-obliterating manufacturing step, which in this case is the firing step. During firing, the green body-type unfinished ceramic structures 4 are typically subjected to temperatures on the order of 1100° C. to 1350° C. for time periods which may exceed 16 hours. The precise firing conditions (i.e., time and temperature and other parameters measured by sensors in the kiln 31 which are not shown) are relayed to the digital processor 11, which proceeds to associate such data with each individual structure 4 and to record it. Under such harsh conditions, all known high-temperature inks that are printable on the surfaces of ceramic green bodies either fade or run to the extent that relatively complex markings of the type needed to contain a unique identification number are either seriously degraded or obliterated to the point of illegibility. Hence printed marks are unreliable identification tools for ceramic structures experiencing these extreme conditions. To solve this problem, as the fired ceramic structures 4 leave the exit 39 of the kiln 31, optical readers 41*a*, 41*b* read the identity plates 29 on the kiln cars 27, and relay this information to the digital processor 11. The digital processor 11 then associates each of the unique positions 26 on the kiln cars 27 with a particular ceramic structure, and proceeds to operate a pair of vertically movable ink jet print heads 43*a*, 43*b* to re-print an identifying mark 44 on each of the structures 4. The newly-printed mark 44 may be the same mark 13, or a different mark that the digital processor 11 associates with the original mark 13. Either way, the identity and manufacturing history of each ceramic structure 4 is maintained with the memory of the digital processor 11. A pair of optical readers 45*a*, 45*b* located downstream of the print heads 43*a*, 43*b* confirm the integrity of the newly-printed marks 44. The ceramic structures 4 may then be palletized for storage or move directly into further manufacturing stations.

Figure 5:
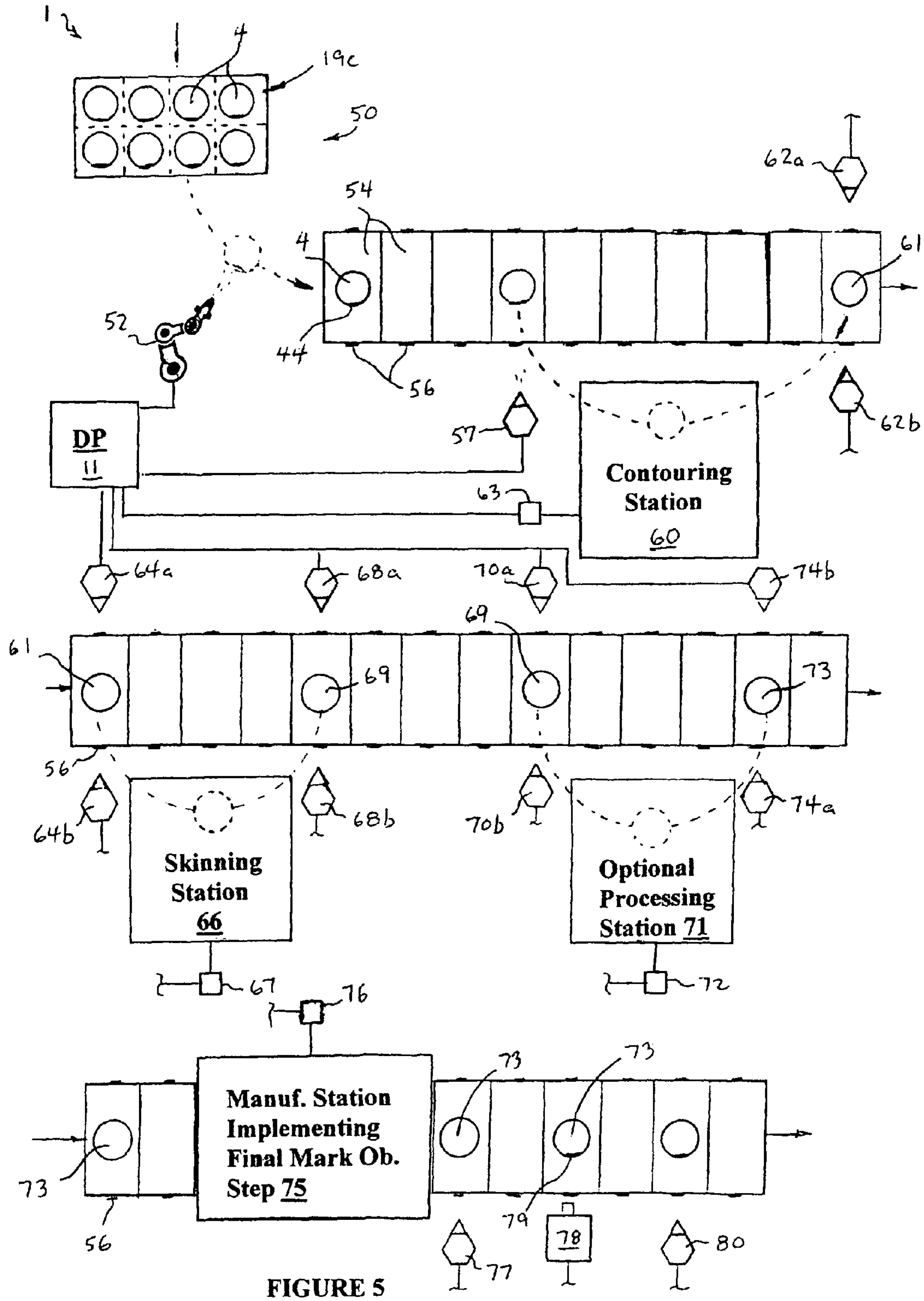
FIG. 5 is a schematic diagram of a preferred system for implementing subsequent steps of the method wherein the identification code of each ceramic structure is associated with a unique slat on the conveyor system and recorded by the digital processor, the skin of the ceramic structure is removed (thereby obliterating the identification code) but the identity retained by its position on a unique slat of the conveyor system.

FIG. 5 illustrates how the method of the invention may be implemented with respect to optional manufacturing steps which may occur after the initial firing of the ceramic structures 4. For the purposes of simplification, the palletizing, de-palletizing and storage steps that are often associated with these steps have been largely eliminated from this description, it being understood that such steps may or may not be included between the optional manufacturing steps described hereinafter.

In a case where the fired and re-marked ceramic structures 4 are subjected to a contouring operation, the fired, unfinished ceramic structures 4 are moved to a de-palletizing area 50 where a robotic arm 52 controlled by the digital processor 11 unloads them onto a portion of the conveyor system 5 formed from a belt of conveyor slats 54, each of which has its own identification plate 56. The conveyor slats 54 carry the fired and re-marked ceramic structures to an optical reader 57 placed in front of a contouring station or loop 60. The optical reader 57 reads the new identification mark 44 of the structure 4 just before it enters the station 60. The outer skin and the new mark 44 are completely removed at the contouring station 60 via conventional abrasive manufacturing procedures. After the skin of the structure is removed, the skinless and markless ceramic structure 61 is placed back onto one of the slats 54. At that time, optical readers 62*a*, 62*b* read the identification plate 56 of the particular slat 54 that the structure 61 is placed on and the digital processor 11 associates the slat identification number with the mark 44 that was obliterated as a result of the contouring step. Movement to and from the contouring station 60 is preferably implemented by robotic arms, not shown. Conditions accompanying the contouring step of manufacture are relayed from a sensor 63 to the digital processor 11, which records this information and associates it with the identification number of the ceramic structure 61.

After contouring has been completed, and the ceramic structure 61 has been subjected to a series of laser-implemented measurements at a measuring station (not shown) to determine its outside dimensions, it then proceeds to a skinning station 66 where a new skin is molded over its exterior, the thickness of the skin being selected so as to achieve a desired product size. Identification is accomplished by optical readers 64*a*, 64*b* which read the identification-plate 56 of the slat 54 that the ceramic structure 61 is positioned and relay the plate number to the digital processor 11, which in turn associates the plate number with the identification number of the ceramic structure 61. After the skinning step has been completed, the specific conditions surrounding the skinning operation are sensed by sensor 67 and relayed to the digital processor 11, which associates this information with the identification number contained in the mark 44 and records it. The skinned ceramic structure 69 is then removed from the skinning station 66 and positioned on a different slat 54. At this time, a pair of optical readers 68*a*, 68*b* read the identification plate 56 of the new slat that the ceramic structure 69 is placed on and again relay this information to the digital processor 11, which again associates this plate number with the identification number that was present in the mark 44.

This same procedure for maintaining the identification of the ceramic structure 69 is followed via optical readers 70*a*, 70*b* and 74*a*, 74*b* as the structure 69 enters and leaves optional processing station 72, which may be a plugging station, a polishing station, a subsequent firing station, etc. Again, the specific conditions of the optional processing station 71 are relayed to the digital processor 11 via condition sensor 72, which again associates this information with the identification number that was embedded in the mark 44, and records it. Finally, this same procedure is followed as the further processed ceramic structure 73 enters a manufacturing station 75 that implements a final mark obliterating the manufacturing step. Specifically, an optical reader 77 reads the identification tag 56 on the slat 54 that the structure 73 rests on, and relays this number to the digital processor 11, which in turn looks up the identity of the ceramic structure 73. The digital processor 11 then associates all of the conditions of the station 75 relayed to it by the sensor 76 with the identified ceramic structure 73, and records it, thereby substantially completing its manufacturing history. A printer 78 controlled by the digital processor 11 then re-prints, for the final time, an identifying mark 79 on the ceramic structure 73 which may be the same as the original mark 13 printed on the green body 4 that became the fired, contoured, skinned and further processed ceramic structure 73. A final optical reader 80 connected to the digital processor 11 confirms the legibility of the mark 79 printed on the ceramic structure 73.

Different modifications, additions, and variations of this invention may become evident to the persons in the art. All such variations, additions, and modifications are encompassed within the scope of this invention, which is limited only by the appended claims and the equivalents thereto.

What is claimed is:

1. A method for tracking a plurality of unfinished ceramic structure having an identification mark when said structure is conveyed through a mark-obliterating manufacturing step by a conveyor system, comprising the steps of:

loading a plurality of discrete, unfinished ceramic structures each having a visible identification mark at selected positions on a conveyor system;

processing information relating to the identification mark and the selected position of unfinished ceramic structures on the conveyor system;

using the conveyor system to convey the marked unfinished ceramic structures to a mark-obliterating manufacturing step, and identifying the ceramic structures after completion of the mark-obliterating step by determining position on the conveyor system, and processing information relating to the determined positions with said information relating to the identification marks.

2. The method of claim 1, wherein said mark-obliterating step is a firing step.

3. The method of claim 1, wherein said mark-obliterating step is a contouring step wherein at least part of an outer skin of the ceramic structure is removed.

4. The method of claim 1, wherein said conveyor system includes a plurality of individual conveyor units, wherein each conveyor unit includes an identification mark, and wherein said processing step includes reading information in the ceramic structure identification mark, reading information in the conveyor unit identification mark, and relaying said information'to a digital processor.

5. The method of claim 4, wherein each ceramic structure is placed at a unique position on one of said individual conveyor units, and wherein said processing step further includes associating coordinates representative of the unique position with the information in each ceramic structure identification mark.

6. The method of claim 1, further including the step of re-marking the ceramic structure after completion of the mark-obliterating manufacturing step with a new mark that includes identification information.

7. The method of claim 6, wherein said new mark includes a machine-readable component.

8. The method of claim 6, wherein said new mark includes a human-readable component.

9. A method for tracking an unfinished ceramic structure having an identification mark when said structure is conveyed through a mark-obliterating manufacturing step by a conveyor system, comprising the steps of:

loading an unfinished ceramic structure having a visible identification mark at a selected position on a conveyor system;

processing both information in the identification mark and the selected position of the unfinished ceramic structure on the conveyor system by relaying said information to a digital processor;

conveying the unfinished ceramic structure through a mark-obliterating manufacturing step;

after the mark-obliterating manufacturing step, identifying the ceramic structure by determining its position on the conveyor system and relaying information relating to the determined position to a digital processor;

relating the determined position to said information relating to the identification mark by the digital processor, and re-marking the ceramic structure after completion of the mark-obliterating manufacturing step with a new visible mark that includes identification information.

10. The method of claim 9, wherein said ceramic structure is conveyed through a plurality of mark-obliterating manufacturing steps, and said new mark is applied after completion of the last mark-obliterating step.

11. The method of claim 9, wherein said conveyor system includes a plurality of individual conveyor units, wherein each conveyor unit includes an identification mark, and wherein said processing step includes reading information in the ceramic structure identification mark, reading information in the conveyor unit identification mark, and relaying said information to a digital processor.

12. The method of claim 11, wherein one of said conveyor units additionally includes a plurality of location identification marks applied across an axis of said one conveyor unit, and said location identification marks are used to determine the selected location of the ceramic structure on said one conveyor unit.

13. The method of claim 12, wherein said one conveyor unit conveys said ceramic structure through a drying step.

14. The method of claim 12, wherein said new mark includes all of the information included in said identification mark prior to said mark-obliterating manufacturing step.

15. The method of claim 9, wherein said new mark includes a machine-readable component.

16. The method of claim 9, wherein said new mark includes a human-readable component.

17. The method of claim 9, wherein said mark-obliterating step is a firing step where said ceramic structure is conveyed to a kiln.

18. The method of claim 9, wherein said mark-obliterating step is a contouring step wherein at least part of an outer skin of the ceramic structure is removed.

19. The method of claim 18, wherein said ceramic structure is conveyed to a contouring manufacturing loop during said contouring step, and wherein said conveyor system includes a plurality of individual conveyor units, each of which is marked with an identification mark, and wherein information in the identification mark of the individual conveyor units is read and conveyed to a digital processor.

20. A system for tracking a plurality of unfinished ceramic structures through a manufacturing process that includes at least one mark-obliterating manufacturing step by a conveyor system, comprising:

a conveyor system for conveying a plurality of discrete unfinished ceramic structures to and from a mark-obliterating step;

a marking mechanism that provides a visible identification mark on at least one of the plurality of discrete unfinished ceramic structures prior to the conveyance of said unfinished ceramic structures through said mark-obliterating step;

a positioning mechanism for placing at least one of the plurality of unfinished ceramic structures on at least one selected unique position on said conveyor system, and a digital processor for receiving and processing both the information in the identification mark on the at least one of the plurality of discrete unfinished ceramic structures and the at least one selected unique position of the at least one of the plurality of discrete unfinished ceramic structures on the conveyor system, such that the ceramic structures may be identified by an at least one recorded unique position when the ceramic structures are conveyed away from said mark-obliterating manufacturing step.

* * * * *